United States Patent [19]
Mauron

[11] 3,957,303
[45] May 18, 1976

[54] SAFETY SEAT FOR A CHILD

[75] Inventor: Gerard Mauron, Versailles, France

[73] Assignees: Automobiles Peugeot, Paris; Regie Nationale des Usines Renault, Boulogne-Billancourt, both of France

[22] Filed: Apr. 4, 1975

[21] Appl. No.: 565,151

[30] Foreign Application Priority Data
- Apr. 5, 1974 France .............................. 74.12146
- June 18, 1974 France .............................. 74.21059
- Feb. 27, 1975 France .............................. 75.06147

[52] U.S. Cl. .............................. 297/216; 297/250; 297/386; 297/390
[51] Int. Cl.² .............................. A62B 35/00
[58] Field of Search ............ 297/216, 253, 254, 390, 297/386, 253, 384, 385, 250; 188/1 C

[56] References Cited
UNITED STATES PATENTS

| | | |
|---|---|---|
| 2,833,554 | 5/1958 | Ricordi .............................. 297/390 |
| 3,424,497 | 1/1969 | Brilmyer .............................. 297/250 |
| 3,563,600 | 2/1971 | Converse .............................. 297/254 |
| 3,713,695 | 1/1973 | Von Wimmersperg ............. 297/216 |
| 3,794,379 | 2/1974 | Furey .............................. 297/250 |
| 3,837,670 | 9/1974 | Ailyard .............................. 297/390 |
| 3,861,742 | 1/1975 | Leonard .............................. 297/253 |

*Primary Examiner*—James T. McCall
*Attorney, Agent, or Firm*—Burns, Doane, Swecker & Mathis

[57] ABSTRACT

Energy absorbing means interconnect two separable seat parts of a seat for a child. One of the seat parts comprises the seating, means for attaching the seat to a normal vehicle seat and a rear part of side walls of the child's seat. The other seat part comprises a band and a front part of the side walls. The energy absorbing means are disposed on each side of the child's seat between the two parts of the side walls. The energy absorbing means are adapted to the light weight of the child.

24 Claims, 13 Drawing Figures

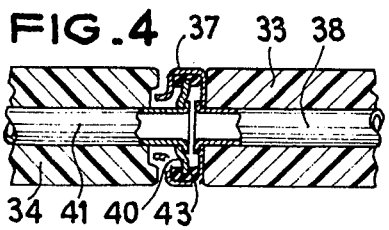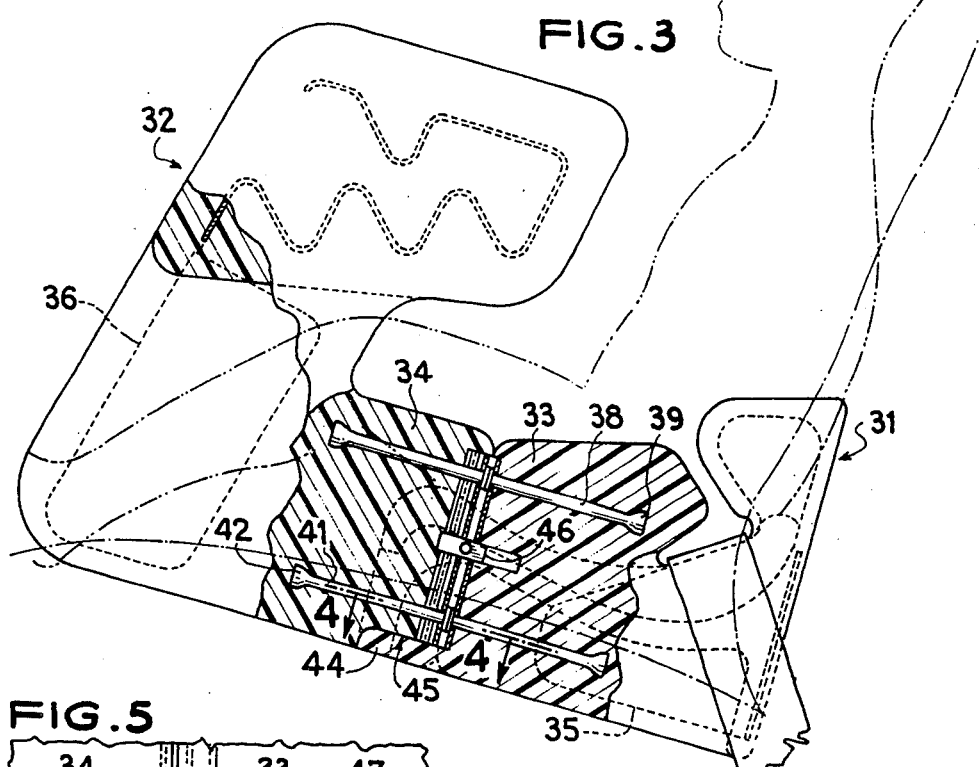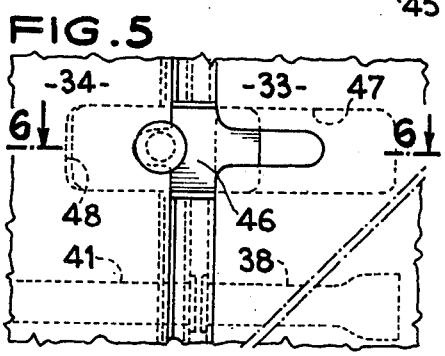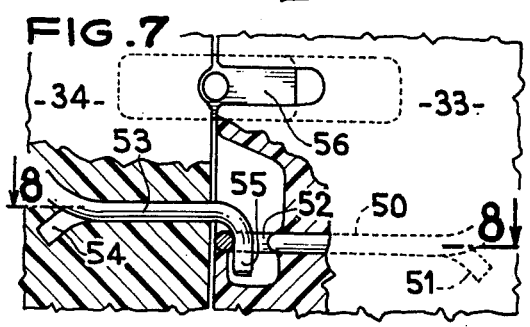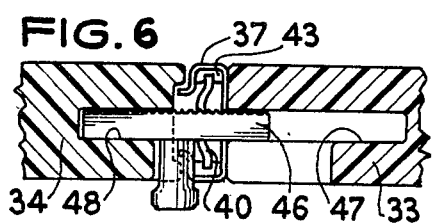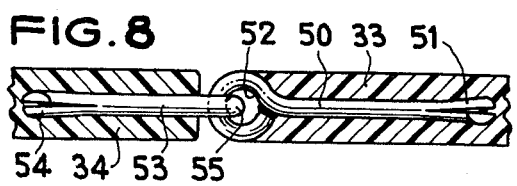

SAFETY SEAT FOR A CHILD

The present invention relates to a seat for a child which is adaptable to a normal seat of a vehicle such as an automobile vehicle.

It is current practice for the transport of young children in a vehicle to place them in a seat which is specially designed for them and adaptable to a normal seat. Moreover, in order to ensure that the child is correctly maintained in the case of a violent shock, it has already been proposed to maintain his seat by means of the safety straps or belts with which the vehicles are equipped. Thus, in accordance with a known arrangement, a seat for a child comprises a base or seating completed by two side walls connected by a band which is placed in front of the chest of the child. This seat is simply placed on the base or seating of the normal seat where it is firmly maintained in the corner formed by the backrest and the seating by means of the safety belt which is placed in front of the band in a guide groove. In this way when a violent shock throws the child forward he is retained by the band of his own seat which is itself held perfectly stationary by the safety belt.

Such an arrangement has a serious drawback: the safety belt is designed to undergo a certain plastic elongation so as to absorb a large amount of energy and progressively brake or retard the body of an adult if the latter is thrown violently forwardly. As the child represents a much smaller mass than that of an adult, his kinetic energy in a relative forward movement is insufficient to plastically elongate the safety belt and he is stopped very suddenly on the band with an excessively high deceleration. This drawback is only imperfectly remedied by providing a band which is plastically deformable under the impact of the body of the child since the braking travel remains insufficient and difficult to reproduce from one device to the other.

Such seats for children are also known which are in two parts pivoted together and lockable with respect to each other so as to facilitate access to the seat. However, in such an arrangement, if there is a fracture in the region of the locking means the front part of the seat pivots and does not retain the child in any way. In the opposite hypothesis, the absorption of energy is practically zero and the padding provided on the front part of the seat is quite insufficient to ensure, or participate in, the safety of the child.

There also exists a seat in two parts interconnected by energy absorbing means and comprising in the known manner a seating, side walls and a band. However, the two parts constituting the seat are very unbalanced in that one thereof comprises the seating or base and all of the side walls whereas the other only comprises the front band. These two parts are therefore of very unequal dimensions and the rear part has a volume which corresponds practically to that of the complete seat. This represents a first drawback, from the practical point of view, in that the seat is more difficult to stow away, for example in the vehicle luggage boot. The second drawback is more fundamental: the band provided in the seat is placed at the level of the abdomen of the child so that practically all effectiveness of the seat is lost in that, in the event of a shock, the thorax and the head are absolutely not retained or braked. This drawback cannot be corrected by merely increasing the vertical dimensions of the band since the position of the connecting means between the band and the seating would not permit resisting the tilting torque which would be produced in the event of a shock. The punctual character and the position of the connecting means therefore render such a seat in practice ineffective.

An object of the present invention is to remedy these various drawbacks and to provide a seat for a child in which the energy absorbing device is really effective and can in particular absorb the tilting torque produced when the body of the child bears against the band of the seat.

The invention therefore relates to a seat for a child arranged in two parts interconnected by energy absorbing means and comprising a seating, two side walls and a band, and means for fixing the seat to a normal vehicle seat, wherein one of the two seat parts defines the seating, the fixing means and the rear part of the side walls, and the other seat part defines the band and the front part of the side walls, the energy absorbing means being disposed on each side of the seat between the two parts of the side walls.

According to other important features:

The band is placed at the level of the thorax of the child.

The energy absorbing means comprise at least two rods which are deformable under the action of the tensile force while absorbing energy and are anchored on one hand in the front part and on the other hand in the rear part of the seat.

The two parts constituting the seat are interconnected by at least a pair of complementary members at least one of which is integral with at least one rod which comprises an enlarged portion and is embedded at least in part in the material constituting the seat.

Said complementary members comprise, on one hand, a slideway having a C or like section integral with one of the parts of the seat and, on the other hand, a rigid slide integral with the other part of the seat and received in the slideway, the direction of relative sliding between the slide and slideway being substantially perpendicular to the direction of the forces exerted on the seat in the event of a shock.

The seat is connected to the vehicle by connecting means which comprise two energy absorbing devices disposed on each side of the seat and adapted to operate under the effect of a force less than that which brings into action the energy absorbing means incorporated in the seat.

Further features of the invention will be apparent from the ensuing description of embodiments of the invention with reference to the accompanying drawings in which:

FIG. 3 is a diagrammatic side elevational view, with parts cut away and partly in section, of a modification of the seat according to the invention;

FIG. 4 is a sectional view taken on line 4—4 of FIG. 3;

FIG. 5 is an enlarged detail view of a part of the seat shown in FIG. 3;

FIG. 6 is a sectional view taken on line 6—6 of FIG. 5;

FIG. 7 is a partial sectional view of a modification;

FIG. 8 is a sectional view taken on line 8—8 of FIG. 7;

Figure 1:
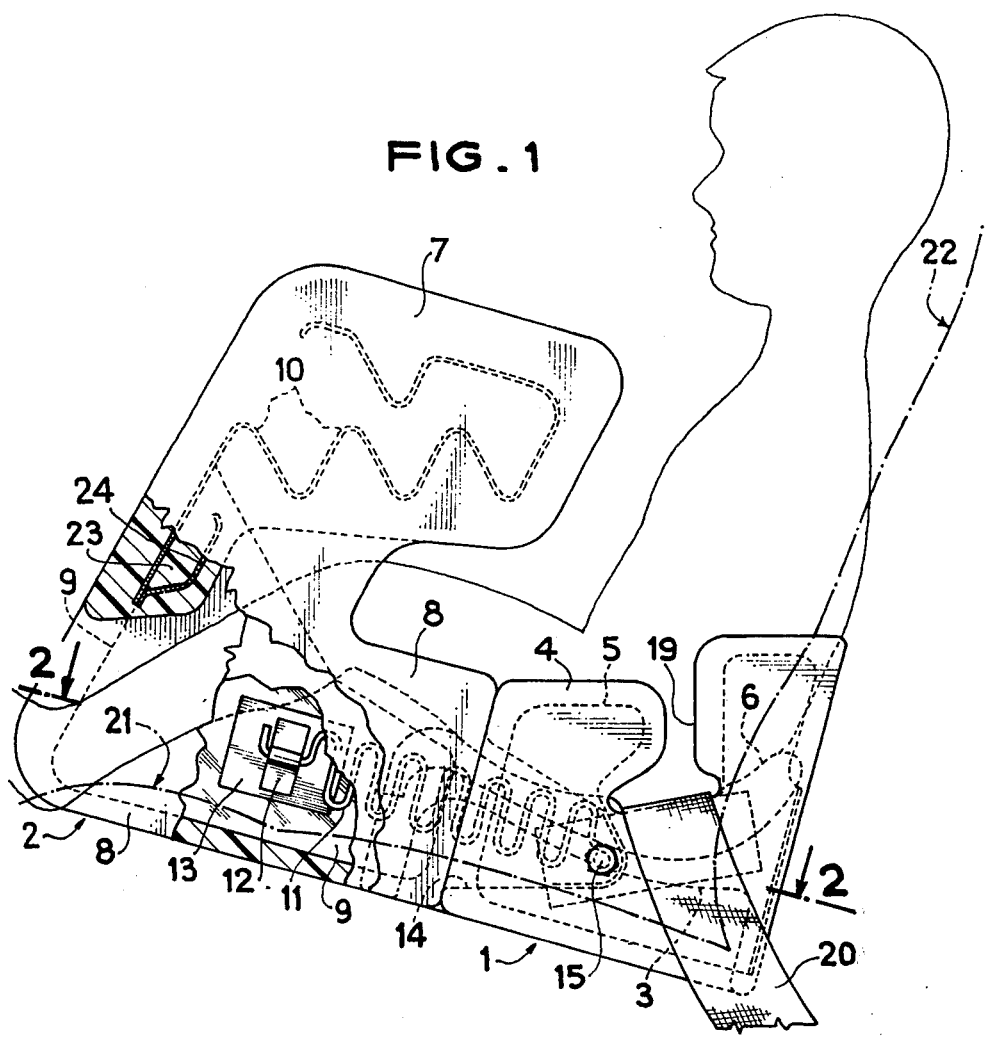
FIG. 1 is a diagrammatic side elevational view, with parts cut away, of a seat according to the invention.
Figure 2:
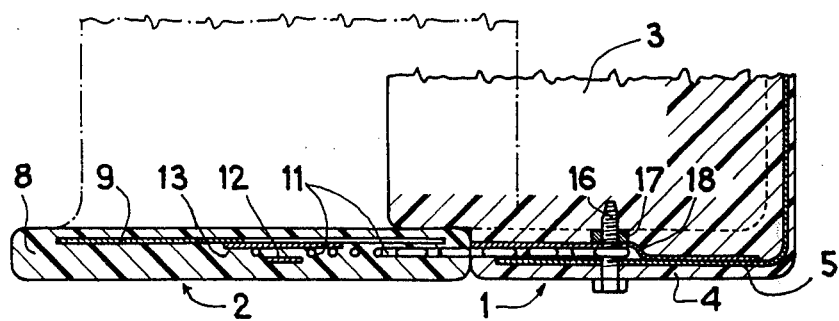
FIG. 2 is a sectional view taken on line 2—2 of FIG. 1.

The seat according to the invention shown in FIG. 1 comprises a rear part 1 and a front part 2 which have practically comparable overall sizes so as to permit an easy stowing away.

The rear part 1 constitutes a seating or seat base 3 defined by two roughly vertical side walls 4. It is constructed for example from a rigid plastics material reinforced by a metal sheet 5 embedded in the mass. This rigid body is covered with a flexible plastics material 6 constituting a cushion.

The front part 2 forms a band 7 which extends rather high in front of the thorax of the child and interconnects two roughly vertical legs 8, the spacing between the legs corresponding to that between the side walls 4 of the rear part 1. The extent in height and width of the surface of contact between the side wall 4 and the legs 8 is considerable so that the effectiveness of the energy absorbing means may be improved, as will be described hereinafter. The front part 2 is also constructed from a rigid plastics material reinforced by a metal sheet 9 embedded in the mass. This reinforcing sheet defines in the band 7 a series of transverse folds 10 so as to permit the absorption of a certain amount of energy by a crushing of the band.

Inside each one of the legs 8 there is partly embedded a rod 11 which is folded in the form of an accordeon and whose front end is maintained by a member 12 fixed to the reinforcement 13 welded to the sheet 9. About one half of each rod 11 extends rearwardly out of the legs 8 and into a cavity 14 formed in the side walls 4 of the rear part 1. The free end of each rod 11 defines an eye 15 whereby it may be fixed to the rear part 1 by means of a bolt 16 which extends through the sheet 5 and is screwed in a nut 17 welded to a member 18 which is welded to the sheet 5.

The side walls 4 comprise in their upper part a notch 19 for the passage of a safety belt 20 adapted to secure the seat for the child which has just been described to a normal seat for an adult in the corner formed by the seating or seat base 21 and the backrest 22.

It can be seen that when a child occupying the seat just described is thrown forwardly, the shock is first absorbed or damped by the crushing of the band 7 and then the front part tends to separate from the rear part, the rods 11 being deployed and absorbing kinetic energy. Owing to the large extent of the facing surfaces of the side walls 4 and the legs 8 the force exerted on the band at the level of the thorax of the child does not produce a tilting torque but is exerted roughly in the direction of the energy absorbers whereby they are able to operate under good conditions. This permits a progressive braking of the child over a relatively large travel. This result is obtained whereas the belt 20 undergoes practically no elongation owing to the insufficient forces produced.

Preferably and as shown in the drawings, the band 7 is extended downwardly by a thinner part 23 which is reinforced by a metal sheet 24 and is in facing relation to the knees of the child. In this way, the thrust exerted by the child when he is thrown forwardly is transmitted by both the thorax and the knees. This has the double advantage of reducing the force to be supported by the thorax and avoiding the risk of the child passing completely between the band and the seat.

The seat shown in FIGS. 3 and 4 comprises a rear part 31 and a front part 32 interconnected in the region of the side walls 33, 34. These two parts have been described in detail hereinbefore and merely their original features will not be mentioned. The two parts 31, 33 are constructed from a rigid plastics material reinforced by metal sheets 35, 36 constituting reinforcements. Preferably, this plastics material is rigid polyurethane foam having a density of between 0.10 and 0.20.

The front edge of the side walls 33 of the rear part 31 is constituted by a slideway having a C-shaped cross section constructed in two sections. Fixed to each section is a tube 38 which extends rearwardly and is embedded at least partly in the mass of the pastics material. Each tube 38 terminates in an enlarged portion 39.

The rear edge of the side walls 34 of the front part 33 is constituted by a metal band 40 which is also in two sections. Fixed to each section of the band is a tube 41 which extends forwardly and is embedded in the mass of the plastics material. Each tube 41 also terminates in an enlarged portion 42. Each band 40 is bordered by shoes 43 of plastics material and the assembly constitutes a slide which is engaged in the corresponding slideway 37.

The side walls 33 of the rear part 31 comprise an extension 44 which extends forwardly and cooperates with a recess 45 provided in the side walls 34 of the front part 33 to permit the relative positioning in height of the two parts of the seat.

At least one bolt 46 sliding in a recess 47 of one of the side walls 43 of the rear part 31 is engageable partly in a cavity 48 formed in the corresponding side wall 34 of the front part 32. This bolt has for function to prevent the child seated in the seat from raising the front part 32 and to facilitate the handling of the seat while avoiding any untimely or undesired disengagement of the front and rear parts of the seat.

The seat just described operates in a particularly simple manner similar in its principle to that described previously.

If the child is thrown forwardly the thrust he exerts on the front part 33 tends to separate the latter from the rear part 31. This separation occurs by a displacement of the tubes 38, 41 with respect to the mass of the adjacent material. In the course of this displacement, the enlarged portions 39, 42 of the tubes must urge back the material and this absorbs a certain amount of energy and permits progressively braking or retarding the child.

The main advantages of this embodiment are the following:

Great constructional simplicity.

Possibility of very exactly dosing the threshold force at which the device acts by acting on the dimensions of the enlarged portion of the tubes and on the density of the polyurethane foam employed.

Constancy of the force throughout the travel.

Good relative guiding of the two parts of the seat which remain parallel to each other, the presence of two series of absorbers and members 37, 40 being made possible by the great height of contact between the two parts of the seat in the region of the side walls.

In the modification shown in FIGS. 7 and 8, the rear part 31 comprises in its side walls rods 50 terminating at the rear in two spread-apart portions 51 and at the front in a ring 52, whereas the side walls of the front part 33 comprise rods 53 terminating at the front in two spread-apart portions 54 and at the rear in a curved portion 55 constituting a hook. The hooks 55 are engaged in the rings 53 so as to assemble the two parts of the seat which are moreover locked together as before by at least one bolt 56.

The operation and the advantages of this modification are the same as those of the seat of the preceding embodiment.

It should be noted that in the preceding embodiment there could be rods in only one of the two parts of the seat, the assembling means of the other part of the seat being then connected to the inner reinforcement.

Moreover, it must be understood that the illustrated bolting system has been given merely by way of example.

The purpose of the embodiment shown in FIGS. 9 to 13 is to improve the effectiveness of the seat when the force of impact is not oriented along the longitudinal axis of the vehicle but makes an angle with this axis. Indeed, in this case the path along which the child travels owing to his inertia does not coincide with the axis of the seat but makes therewith an angle which, although much less than the angle between the direction of the force of impact and the axis of the vehicle, may be sufficient to markedly decrease the effectiveness of the energy absorbing means incorporated in the seat.

Figure 9:
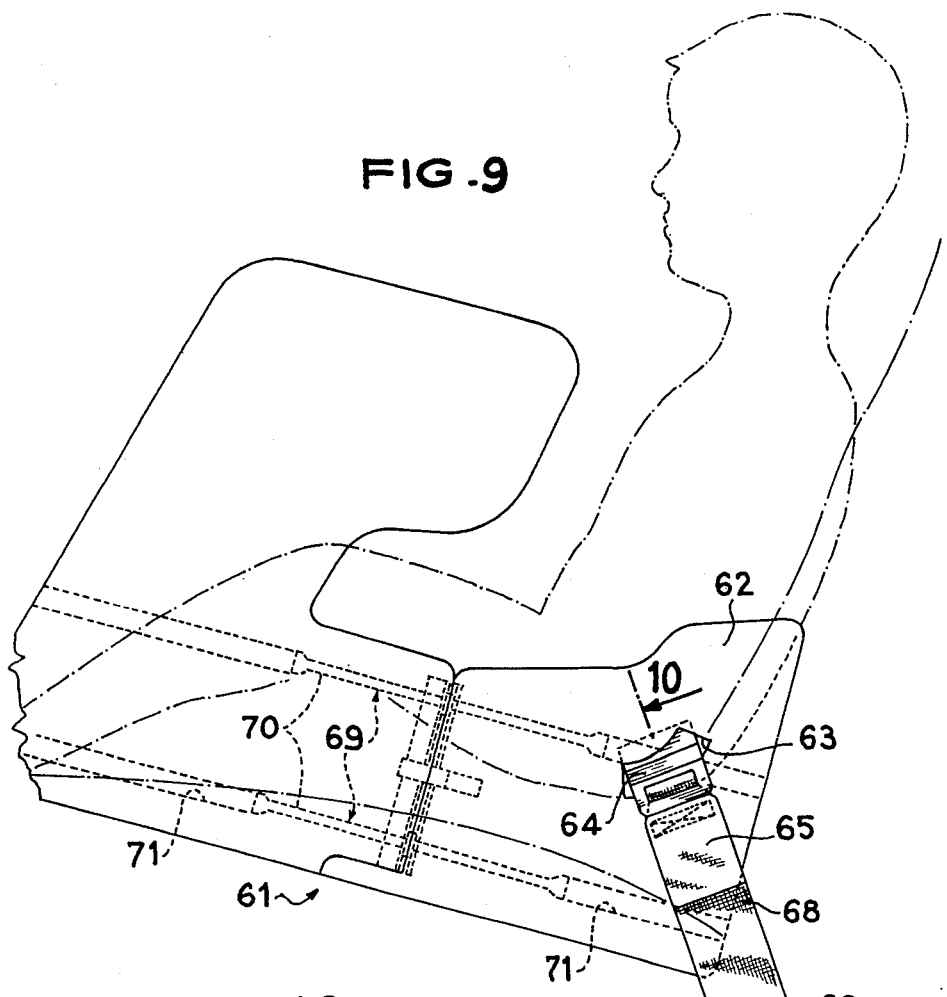
FIG. 9 is a side elevational view of another modification of the seat according to the invention.
Figure 10:
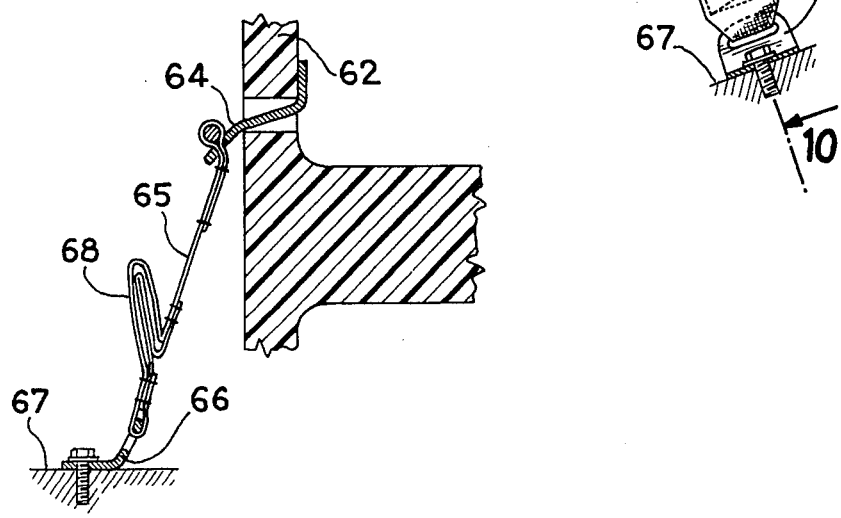
FIG. 10 is a sectional view taken on line 10—10 of FIG. 9.

With reference to FIGS. 9 and 10, the safety seat 61, constructed in two parts and conforming in construction to that described with reference to FIGS. 3 to 8, comprises at the rear part of each one of its two side walls a cavity 63 in which a member 64 is adapted for hooking a belt 65 which is fixed at its other end to a member 66 secured to the floor 67 of the vehicle.

Each of the belts 65 has an energy absorbing device 68. Preferably, this energy absorber is constituted in the known manner by folds which are sewn together or formed when weaving the belt, the connecting threads of which break in succession when a given tensile force is exerted so as to absorb a certain amount of energy (FIG. 10).

Each of the energy absorbers 68 is calibrated or designed to come into action upon application of a force slightly less than that which causes the operation of the absorbers 69 located on each side of the seat and comprising a rod 70 having an enlarged portion embedded in the material from which the seat is constructed. This rod may moreover be engaged as shown in cavities 71 formed when moulding. By way of example, the absorber 68 operates upon application of a force at least equal to 200 kg whereas the absorbers 69 operate upon application of a force at least equal to 220 kg, the difference being in this case of the order of 10%.

Figure 11:
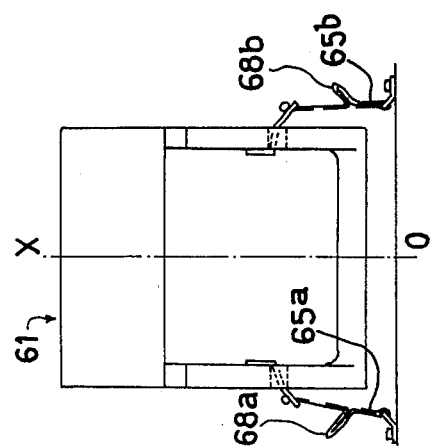

The device operates in the following manner:

FIG. 11 shows the seat before the shock oriented in the longitudinal direction O-X of the vehicle.

Figure 12:
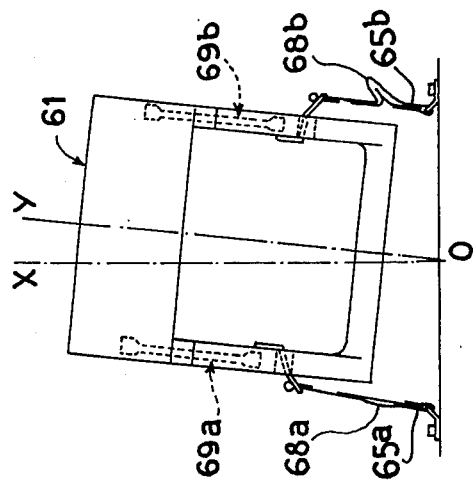

There is shown in FIG. 12 the path O-Y along which the child travels subsequent to a shock in respect of which the force of impact makes a relatively large angle, for example of the order of 30°, with the direction O-X.

The thrust exerted by the child on the front part of the seat 61 causes a traction to be exerted on the left belt $65^a$ which is greater than that exerted on the right belt $65^b$. The left energy absorber $68^a$ is the first to come into operation which has for effect to incline the seat 61 roughly in the direction O-Y.

As the difference of calibration between the absorbers $68^a$, $68^b$ and $69^a$, $69^b$ is relatively small, this initial movement is immediately followed by the coming into action of the absorbers $69^a$, $69^b$ which operate roughly along their axis and therefore under favourable conditions with no risk of rupture of the material surrounding the end portions of the rods 70. This greatly improves their effectiveness.

Figure 13:
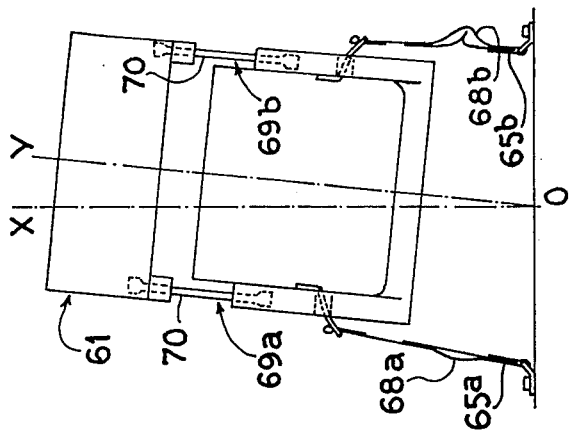
FIGS. 11, 12 and 13 show diagrammatically in plan view different stages of the operation of the seat.

This reveals an unexpected phenomenon: owing to the extreme rapidity with which the different movements occur, it has been found that the operation of the absorbers $69^a$, $69^b$ occurs at the same time as the dissymetric development of the absorbers $68^a$, $68^b$, in accordance with the representation of FIG. 13. This fact confirms the certain and important influence of the action of the absorbers $68^a$, $68^b$ on the operation of the absorbers $69^a$, $69^b$ under the most difficult operating conditions.

A secondary advantage of the improvement afforded by this embodiment will also be noted: in the case of a medium shock, it could happen that only the absorbers $68^a$, $68^b$ operate. It is then sufficient to replace the belts and this considerably reduces the cost of putting the seat back into its initial condition.

Having now described my invention what I claim as new and desire to secure by Letters Patent is:

1. A seat for a child comprising a seating, two side walls having front and rear portions adapted for mutual engagement along a substantial height, a band positioned for thoracic contact during impact, attaching means for attaching the seat to a normal vehicle seat, a front seat part and a rear seat part, energy absorbing and dissipating means interconnecting the front and rear seat parts, the rear seat part including the seating, the attaching means and the rear portion of each side wall, and the front seat part including the band and the front portion of each side wall, the energy absorbing and dissipating means being disposed on each side of the seat between said two portions of the side walls and extending into one of the front and rear portions.

2. A seat for a child comprising a seating, two side walls having front and rear portions adapted for mutual engagement along a substantial height, a band positioned for thoracic contact during impact, attachment means for attaching the seat to a normal vehicle seat, a front seat part and a rear seat part, energy absorbing and dissipating means interconnecting the front and rear seat parts, the rear seat part including the seating, the attaching means and the rear portion of the side walls, and the front seat part including the band and the front portion of the side walls, the energy absorbing and dissipating means being disposed on each side of the seat between said two portions of the side walls and including at least one rod disposed on each side of the seat, being plastically deformable upon application of a tensile force thereon and thereby capable of absorbing energy, and having one portion anchored in the front seat part and another portion anchored in the rear seat part.

3. A seat as claimed in claim 2, wherein a recess is provided on each side of one seat part and each rod is permanently fixed at one end of the rod to the other of the two seat parts and is detachably secured to said one seat part in said recess.

4. A seat as claimed in claim 2, wherein said rod is a corrugated metal rod.

5. A seat for a child comprising a seating, two side walls having front and rear portions adapted for mutual engagement along a substantial height, a band positioned for thoracic contact during impact, attachment means for attaching the seat to a normal vehicle seat, a front seat part and a rear seat part, energy absorbing and dissipating means interconnecting the two seat parts, the rear seat part including the seating, the attaching means and the rear portion of the side walls, and the front seat part including the band and the front portion of the side walls, the energy absorbing and dissipating means being disposed on each side of the seat between said two portions of the side walls and being partially received by one of said two portions and including for each side wall a pair of interengaged complementary members and at least one rod which is integral with at least one of said members and has an enlarged portion embedded at least partly in the material of which the seat is constituted whereby the enlarged portion expands the surrounding material when a tensile force is applied to the rod thereby absorbing energy.

6. A seat as claimed in claim 5, wherein said enlarged portion is disposed at the end of the rod remote from the region of connection between the two parts of the seat.

7. A seat as claimed in claim 5, wherein the material employed for constructing the seat is a rigid polyurethane foam whose density throughout is between 0.10 and 0.20.

8. A seat as claimed in claim 5, wherein said complementary members comprise a slideway having a substantially C-shaped cross section integral with one of the seat parts and a rigid slide integral with the other seat part and engaged in a slideway, the direction of relative sliding between the slide and slideway being substantially perpendicular to the direction of the forces exerted on the seat in the event of a shock.

9. A seat as claimed in claim 8, wherein the slideway and the slide are constructed from two sections.

10. A seat as claimed in claim 5, wherein said complementary members comprise hooking means at least one of which hooking means is formed at one end of said rod.

11. A seat as claimed in claim 10, wherein the hooking means comprise at least one ring and a hook.

12. A seat as claimed in claim 5, wherein the rods are tubes enlarged in end portions remote from a region of the seat in which the two seat parts are adjacent to each other.

13. A seat as claimed in claim 5, wherein the rods have one end having two spread apart portions embedded in the material of the seat.

14. A seat as claimed in claim 5, wherein the two seat parts have facing faces and means are provided in the facing faces for ensuring the correct relative positioning of the two seat parts.

15. A seat as claimed in claim 5, comprising at least one locking means for locking the two seat parts together after mutual engagement of complementary parts.

16. A seat as claimed in claim 1, wherein the band comprises a reinforcement capable of deforming while absorbing energy.

17. A seat as claimed in claim 1, wherein the band is extended downwardly by a thinner part located to be positioned in front of the knees of a child seated in the seat.

18. A seat as claimed in claim 17, wherein the lower part of the band is reinforced by a reinforcement capable of being deformed while absorbing energy.

19. A seat as claimed in claim 1, wherein the attaching means comprise two second energy absorbing and dissipating devices which are disposed on each side of the seat and are capable of operating under the effect of a force less than that which causes said energy absorbing means to come into action.

20. A seat as claimed in claim 19, wherein the attaching means comprise two belt means.

21. A seat as claimed in claim 20, wherein each belt means forms at least one folded portion which is sewn to the rest of the belt means by threads which are capable of breaking in succession subsequent to the exertion of a given tensile force.

22. A seat as claimed in claim 20, wherein each belt means forms at least one folded portion which is formed in the course of the weaving of the belt means, woven threads which hold the folded portion in position being capable of breaking in succession subsequent to the exertion of a given tensile force.

23. A seat as claimed in claim 19, wherein the difference between the values of the forces at which the two energy absorbers come into action is of the order of about 10%.

24. The seat of claim 1 wherein the front and rear portions are fabricated of plastic material and wherein a rigid member extends between the front and rear portions and includes a laterally extending portion embedded in one of the front and rear portions whereby forces tending to separate the front and rear portions cause the embedded laterally extending portion to expand the plastic material thereby absorbing and dissipating energy.

* * * * *